US010645923B2

(12) United States Patent
Hiley

(10) Patent No.: US 10,645,923 B2
(45) Date of Patent: May 12, 2020

(54) INSECT BAIT

(71) Applicant: Carina Hiley, Balhannah (AU)

(72) Inventor: Carina Hiley, Balhannah (AU)

( * ) Notice: Subject to any disclaimer, the term of this patent is extended or adjusted under 35 U.S.C. 154(b) by 149 days.

(21) Appl. No.: 15/846,310

(22) Filed: Dec. 19, 2017

(65) Prior Publication Data
US 2018/0125053 A1 May 10, 2018

Related U.S. Application Data

(62) Division of application No. 13/806,607, filed as application No. PCT/AU2011/000764 on Jun. 22, 2011, now abandoned.

(30) Foreign Application Priority Data

Jun. 24, 2010 (AU) ................. 2010902802

(51) Int. Cl.
*A01N 25/00* (2006.01)
*A01M 1/20* (2006.01)

(52) U.S. Cl.
CPC ......... *A01N 25/006* (2013.01); *A01M 1/2016* (2013.01)

(58) Field of Classification Search
CPC ...... A01M 1/02; A01M 1/103; A01M 1/2005; A01M 1/2011; A01M 2200/011; A01M 1/2016; A01M 1/106; A01M 2200/012; A61K 9/20; A61K 9/2072; A61K 9/2086; A01N 25/00; A01N 25/006; A01N 25/26
See application file for complete search history.

(56) References Cited

U.S. PATENT DOCUMENTS

| | | | |
|---|---|---|---|
| 3,940,875 A | 3/1976 | Basile | |
| 5,674,518 A | 10/1997 | Fajt | |
| 5,775,026 A | 7/1998 | Pearce et al. | |
| 6,216,384 B1 | 4/2001 | Dickson et al. | |
| 8,652,520 B2 * | 2/2014 | Habboushe | A61K 9/0056 424/468 |
| 2002/0086054 A1 * | 7/2002 | Shaw | A61K 9/0004 424/473 |
| 2005/0097811 A1 | 5/2005 | Scribner | |
| 2005/0281854 A1 | 12/2005 | Grech | |
| 2006/0073180 A1 | 4/2006 | Steward | |
| 2006/0292222 A1 * | 12/2006 | Jonasse | A61F 9/0017 424/468 |
| 2007/0141155 A1 * | 6/2007 | Solomon | A61K 9/2072 424/472 |
| 2008/0233190 A1 * | 9/2008 | Solomon | A61K 9/2072 424/467 |
| 2008/0260824 A1 | 10/2008 | Nangia | |
| 2008/0300280 A1 | 12/2008 | Pohlman | |
| 2009/0082315 A1 | 3/2009 | Tawakol | |
| 2009/0304753 A1 * | 12/2009 | Tsabari | A61J 3/071 424/400 |
| 2012/0164217 A1 | 6/2012 | Cade | |

* cited by examiner

*Primary Examiner* — Thanh Pham
(74) *Attorney, Agent, or Firm* — Harness, Dickey & Pierce, P.L.C.

(57) ABSTRACT

An insect bait that can be carried by the insect, that includes a toxicant capable of killing insects in a nest, and that includes attractants, having at least one non-toxic layer that delays contact with the toxicant, wherein the size, shape and attractants attract the insect to take the whole of the bait to a nest situation where further manipulation of the bait by the insect will release the toxicant.

11 Claims, 2 Drawing Sheets

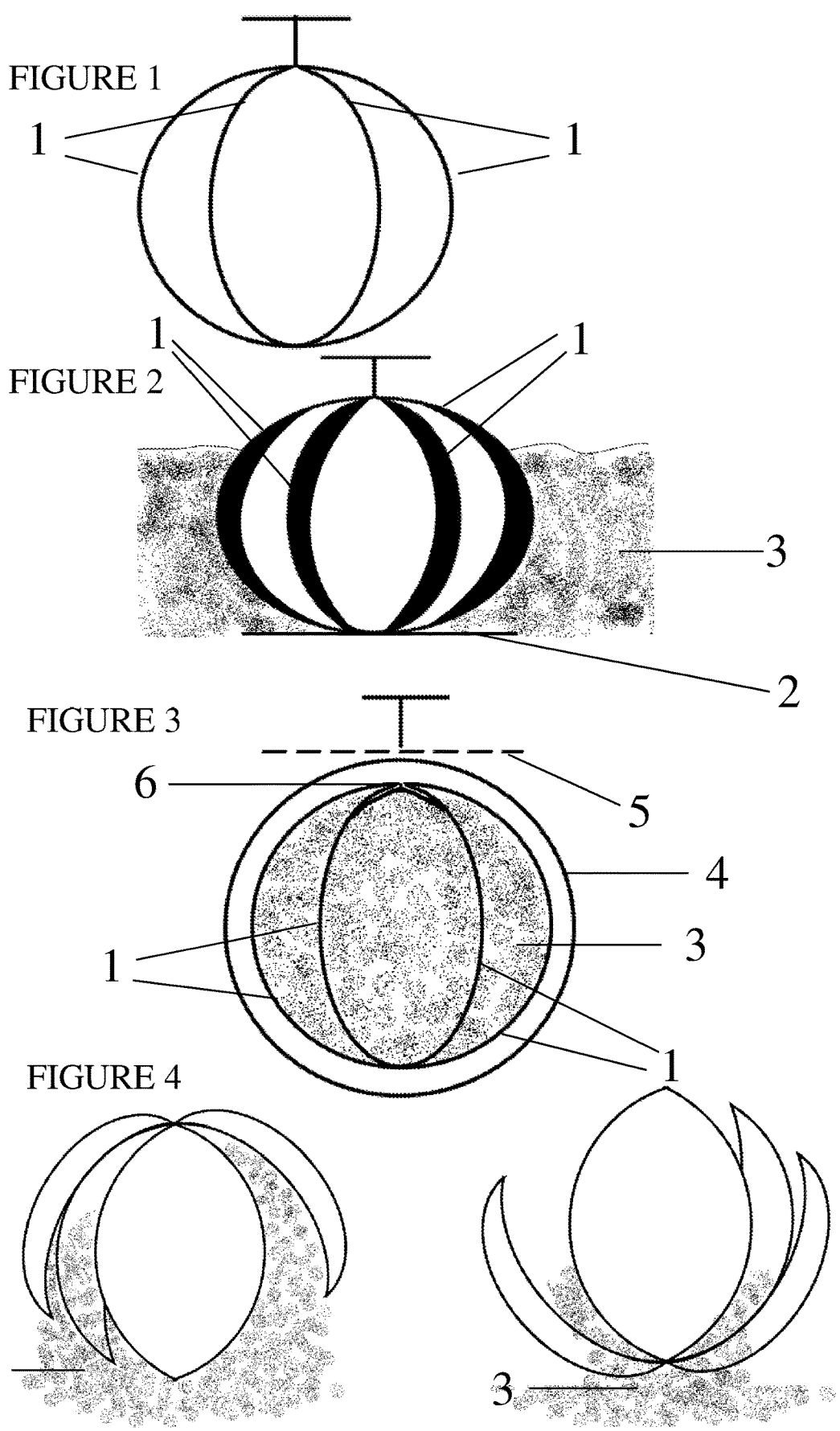

INSECT BAIT

CROSS-REFERENCE TO RELATED APPLICATIONS

This application is a divisional of U.S. application Ser. No. 13/806,607, filed Dec. 21, 2012, which is a 371 National Stage of International Application No. PCT/AU2011/000764, filed Jun. 22, 2011, which claims priority to Australian Patent Application No. 2010902802, filed Jun. 24, 2010. The contents of the above applications are incorporated herein by reference in their entirety.

TECHNICAL FIELD

This invention relates to a bait to be used in the eradication of insects, particularly European Wasps and their nests, where the bait can be carried by the insect to its nest.

BACKGROUND ART

The European wasp also commonly known as German wasp, yellow jacket, and hornet, is found in the Northern Hemisphere (Europe, North Africa, Asia) and has been introduced to countries like Australia, New Zealand, and North/South America. It is considered a pest in introduced countries because it damages ecosystems, taking natural food sources from other insects, which affects birds, other insects, and it ousts native wasps from their natural habitats. They affect the biodiversity of any area they inhabit and in New Zealand it has affected the honeybee population. It makes the top 100(98) of the Global Invasive Species list.

They are an extreme nuisance to fruit-growers and the like, and to where food and drink are consumed, and to any outdoor activity because of their aggressive nature and that they can sting many times.

Their nests are capable of containing between several hundred and several thousand wasps. Each nest on average produces between 1 000 and 2 000 queens a season, and because they can travel a long distance to nest, they are a reoccurring problem even when all nests in the area are destroyed. In some regions, the wasps do not die off over winter so the potential problems to human activity are magnified.

Destroying the nest is the most effective way to control wasps but locating or accessing it can be difficult. Most nests are underground but they can be found anywhere there is shelter. E.g. cavity walls, tree trunks.

Because European Wasps are attracted to both sweets and meats, they are omnivores, and sometimes feed on these at different times, it has been difficult to find baits that work efficiently and don't attract other insects/animals when only a single bait attractant is used. E.g. bees/sugars. Besides lures that trap wasps physically in a container of some type, it is known that killing even a thousand wasps may make little difference as the queen is laying more eggs, the preferred methods have been; baiting by a toxicant with attractants for ingesting, the whole of the inhabitants of the nest need to consume, and this can be a large amount of bait. And secondly by lacing meat or some form of attractant with insecticide, that they carry on their body and food source, usually as a dust and this also can be a large amount of bait depending on the nest size. Both methods rely on the toxicant being a delayed toxicity or a lower level of concentration.

Typically, the ways of reducing a local wasp problem include either finding and destroying all nests in the area, or using poison bait. Manual destruction of nests over large areas of shrub land is likely to be difficult and labour intensive.

Poison baiting is widely used to control wasp populations as it has the advantage that foraging wasps carry the poison back to the nest, meaning it is unnecessary to locate nests or approach those that are very large or difficult to get close to.

However although most baits show some degree of attraction to wasps, bait attraction can vary between different sites and regions, weather conditions and within a population throughout the wasp flight season. This variation may be influenced by the presence of other food sources, nest requirements and behavioural traits. Protein rich foods and carbohydrates are generally attractive to foraging wasps, but relative attractiveness may vary throughout the season due to changing nest requirements. However there is currently no universal commercial bait for wasp control.

In New Zealand poison must be mixed with protein-based bait, as carbohydrate baits risk poisoning bees. However at certain times wasps are not greatly attracted to protein baits, which can cause poisoning operations to fail. Toxins such as 1080, sulfluramid and fipronil mixed with sardine cat food can be effective at controlling wasps. Fipronil is faster acting and equally toxic at concentrations 1000 times lower than sulfluramid. Fipronil was found to reduce colony activity of *Vespula* spp. by 99.7% in treated areas. In North West Patagonia (Argentina) it has been found that beef baited with fipronil reduced wasp densities by 80-100%. Further studies have found that the most attractive bait for *V. Germanica* was beef. Honey and corn syrup did not attract foraging wasps as effectively, even when mixed with beef. The only effective insecticide was hydramethylnon 2% which reduced wasp populations by 54% after 72 hours. Although fipronil was more effective, the potential of insects to develop resistance to consistent use of one product may suggest the need for alternating use of insecticides in some situations.

Although poison baiting can kill 80-100% of the colonies within a site invasion is extremely likely. Wasps have been recorded foraging up to 4 km from their nest. Even if the controlled site was very large, queen wasps which can fly 30-70 km to find suitable nesting sites are highly likely to invade the following spring.

Biological control has been used in attempts to achieve widespread control of wasps. Icheumonid parasitoids *Sphecophaga vesparum vesparum*, S.v.burra and *Sphecophaga orientalis* have been utilised as biological control agents for *V. germanica*.

A recent study in Chile examined the pathogenicity of two entomopathogenic fungi, *Beauveria bassiana* and *Metarhizium anisopliae*. It was determined that two strains of *B. bassiana* were pathogenic for workers and males of *V. germanica* reaching high mortality and sporulation percentages.

Some other general factors that may need to be considered include: *V. germanica* constructs significantly larger nests in New Zealand (part of its introduced range) than it does in Europe; over-wintering of nests (i.e. re-using the same nest from one summer to the next) also occurs more frequently in New Zealand than in Europe. This suggests the wasp may be harder to control in areas of its introduced range.

SUMMARY OF INVENTION

The main aim of this invention is to allow the insects, in particular wasps, to carry the maximum amount of toxicant to the nest, without being in contact with the toxicant, utilizing the least amount of insects as carriers. In theory using a wasp for example, if a wasp returns to a food source on average every 5 minutes, that is, 12 times an hour, 96 times in 8 hours, just one taking the bait would be enough as the wasps pass the food to another worker to feed the larvae, and would not come into contact with the toxicant until the wasp retires to the nest, and would be able to return to the food source while ever it is available.

The bait is comprised of three key parts. The first part is an insecticide or some form of toxicant, or any agent that will kill or help to kill the nest. The second part is a non-toxic destructible or protective layer that encases the first part and may adhere to or be the third part of the bait. The third part is an attractant layer that encases the second and first parts and is designed to attract insects and in particular European and English wasps.

Currently, in most baiting programs an attractant is used as a first lure and once an average of 10 wasps are sighted in a 10 minute period the attractant is swapped and/or an insecticide is added.

The current invention will eradicate this need of a first lure, and with fewer wasps needing to take the bait the importance of particular attractants can be reduced.

In addition, the need for a delayed-action kill and a lower level of concentration insecticide/toxicant is removed.

A quicker kill-time will mean that nests can be destroyed at an earlier age before the larvae hatch and produce more workers, and that wasps will not be able to build up a resistance to the toxicant.

The invention can be used, if need be, to introduce other factors e.g. chemical, biological, stronger insecticides, different pesticides etc. to the nest that were unable to be used by previous methods.

This invention may provide a commercial bait that can be used where wasps are a problem.

In one aspect of the invention there is provided;

An insect bait that can be carried by the insect, that includes a toxicant capable of killing insects in a nest, and that includes attractants, having at least one non-toxic layer that delays contact with the toxicant, wherein the size, shape and attractants attract the insect to take the whole of the bait to a nest situation where further manipulation of the bait by the insect will release the toxicant.

Preferably the insects are wasps including English and European wasps.

Thus in a preferred aspect of the invention there is provided;

A wasp bait capable of killing wasps where said bait includes a toxicant capable of killing wasps in a nest, at least one protective layer that encases the toxicant which destructs upon manipulation by said wasp after a period of time, and an attractant layer that encases the protective layer that attracts the wasp, wherein the bait size, shape and attractant, allow the wasp to carry the bait to the nest of the wasp.

Preferably, the bait is a spherical shaped capsule filled with a toxicant (an insecticide/pesticide as a free-flowing powder or dust is preferred) with or without additives, but the toxicant form could also be a solid, liquid, gas, paste or gel, or any other material that acts as a toxin to the insect, and it is completely surrounded by an attractant layer.

The bait is of a size that may be carried by a wasp to the wasp nest. The bait is preferably a sphere or ball of less than 10 mm in diameter, preferably averaging 4 mm-6 mm in diameter, which is roughly the size of a wasp's thorax.

The exact shape and size of the bait is not critical as long as it is of a shape and size that the wasp is capable of carrying back to a wasp nest although both can be used to make bait more attractive.

The spherical design of the bait is effective because it does not instantly allow the wasp to have the need to tear parts of the ball away from itself, it presents the same surface to the wasp if moved. Worker wasps have very few enzymes in their gut and consume very little of the food they source. They cut or tear the food into a manageable size and roll it underneath themselves to carry. They bring food into the nest and pass it to other workers who feed the larvae. The larvae release a creamy blob of a pre-digested substance which contains all the sustenance a worker needs. When the larvae get older and cannot supply enough of this substance is when wasps become more attracted to sweets. This is trophollaxic feeding and the key to social contact between the workers and the young. The spherical design gives greater flexibility in baiting preferences. In previous methods, liquid or food with a toxicant needs to remain attractive and available to the wasp for the time it takes to carry enough of the toxicant to the nest and this toxicant has to be a delayed-kill and/or lower concentration.

The protective layer may in part be a plastic, but may also be made of artificial or food materials or combinations of all three, with an emphasis on scent/s.

The protective layer that encases the toxicant, will be self-destructing in some way, for example, it may have perforations, holes, slits, or is easily torn (in that it adheres to, or is part of the outer attractant layer) shrinks, cracks, dissolves etc., so that once the capsule or ball is taken to the nest it releases the toxicant as the outer attractant layer is being removed. The wasp removing or feeding on the attractant layer allows the layer within to destruct. The ball will then spill the toxicant from the holes, tears, splits, etc. as the outer attractant layer is eaten, removed, touched or moved.

Because the protective layer prevents initial contact of the toxicant with the wasp, any suitable insecticide/toxicant can be used.

The attractant layer may be made up of more than one layer or combination of attractants designed to give the texture, feel, and smell of a food source, namely meats (protein) and sugars (carbohydrates), but may be a variety of same or others, artificial or natural. Other attractants are well known, e.g. beef, corn syrup, fish, beer, fermenting fruit, pheromone, kairomones, etc. and any could be used.

The attractants are designed to give the bait the feel and smell of real food. The inner part of this bait is toxic and the rest is a foil to appear as solid food.

Because of the omnivore nature of the wasp and that at different times they are attracted less to protein baits the ball attractants should contain both sweets (carbohydrates) and meat (protein) scents. This combining of scents appears to make the food source more attractive to the wasp. It also stops other insects being attracted, especially bees (the outer attractant layer being a food source and non-toxic also reduces the risk to bees). When the scent/s or food is combined in an outer attractant layer, or the ball is layered with differing scents the ball is uniform in its attractiveness to the wasp and they seem to be unaware of foreign objects inside it. No matter how minuscule the bait is, if part is a foreign object, i.e. not food, the wasp will remove the food from the foreign object, therefore the bait works better if there is an outer attractant layer solely as a food attractant, and to disguise the presence of foreign objects/materials. The bait should be as smooth as possible on its surface to prevent the wasp from taking pieces from it, a softer gel-type mix is ideal, yet will allow minute pieces to be taken if they taste-test it, without damaging the overall shape of the ball, and it can have attractants added to it. It is soft, which they prefer, and stops contact with the layer within containing the toxicant because of its spongy feel. The ball is an attractant itself, if it is the right size, the right feel, has moisture to satisfy water needs, a combination of the right attractants, and is easily rolled and taken.

An attractant may also be incorporated in all parts of the ball, including the toxicant, so the ball remains attractive to the wasp, especially in the nest, and as they remove the attractant layer.

The invention further includes a method for eradicating wasps, where said method, includes a wasp bait of the current invention, where the wasp is attracted to the bait, and carries the bait to a wasp nest, where upon the bait releases the toxicant in the nest upon further manipulation of the bait by a wasp.

The invention further includes a method for eradicating wasps and locating a wasp nest, where said method, includes a wasp bait of the current invention having a tracking device, where the wasp is attracted to the bait, and carries the bait to a wasp nest, where upon the bait releases the toxicant in the nest upon further manipulation of the bait by a wasp, and wherein said tracking device allows a tracker to locate said wasp nest.

DETAILED DESCRIPTION OF THE INVENTION

Many different materials were tested for suitability and many balls were made that had little discernable difference in attractiveness to wasps, in that wasps were attracted to just the balls when enough of the balls were placed and that in theory should allow a toxicant or insecticide dust to be released in the nest. Unscented talcum powder was used as a substitute weight and similar product to insecticide dust at first to test attractiveness and observe the taking of the ball to the nest. It was mixed with a small percentage of icing sugar as an attractant odour within the ball. The attractant layer was a mix of food materials. One example is gelatine mixed with water and infused with meat and sugar scents.

To assist with understanding the invention, reference will now be made to the accompanying drawings which show these examples of the invention. In describing the preferred embodiment of the subject invention, it is to be stressed that the following description is of only one embodiment thereof and that such description shall not be construed as limiting the scope of the invention.

IN THE DRAWINGS

FIG. 1 shows a flat view of a hollow sphere made preferably of a suitable plastic, however other materials may also be used. It is joined as one piece to a holding strip.

Slits 1 are shown on the face of the drawing and it is assumed that the back view is identical. With this the sphere is for its purpose a solid type object.

FIG. 2 shows the hollow sphere compressed against a solid surface 2 and the slits 1 are opened. This allows the insecticide dust 3 to be shaken or vibrated in to fill the sphere.

FIG. 3 shows the slits 1 closed with the insecticide dust 3 contained within, an attractant layer 4 completely surrounding the sphere, where the sphere has been cut away 5 from its holding strip, and the slits 1 no longer joined 6 at the top of the sphere.

The attractant layer 4 forces the slits 1 to remain closed until the insect feeds upon the attractant layer in the nest.

FIG. 4 shows the sphere without the attractant layer and how the sphere will open when pressure from the attractant layer is removed thus spilling the insecticide dust 3 from the opened slits, but still retains its shape for rolling movement.

Figure 5:
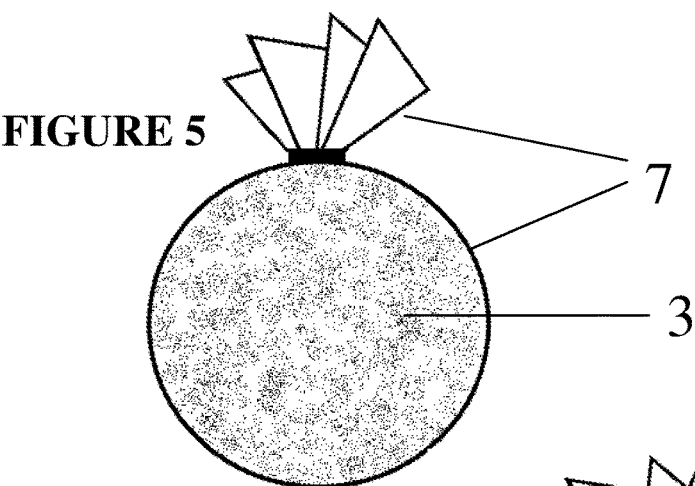
FIG. 5 shows another example of a sphere where a piece of gelatine-skin 7, but any suitable materials can be used, is wrapped around an amount of insecticide dust 3, and twisted at the top to form a sphere.
Figure 6:
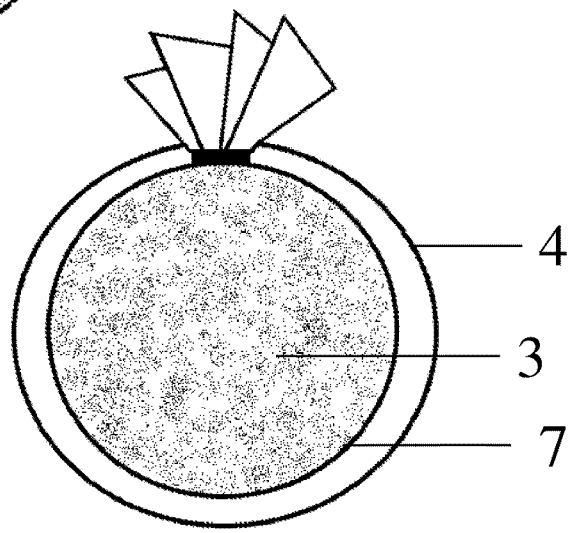

FIG. 6 shows the sphere having an attractant layer 4 completely surrounding the gelatine-skin 7. This was done by dipping it into an attractant mix and because the dipping involves moisture content the gelatine-skin 7 adheres itself and becomes part of the attractant layer 4. The insecticide dust 3 is shown contained within.

Figure 7:
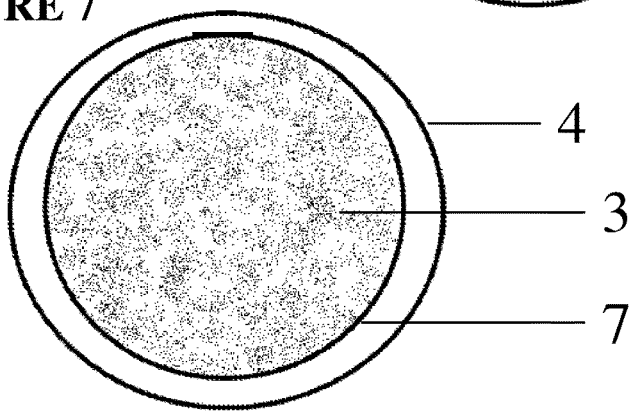

FIG. 7 shows the sphere with the twisted piece cut off and the sphere is re-dipped into the attractant mix to make the sphere smooth and joined. This is also a diagram of how a finished bait ball or sphere will be, in that it shows a toxicant, in this case insecticide dust 3, a destructing layer, in this case a gelatine-skin 7, and an attractant layer 4.

Figure 8:
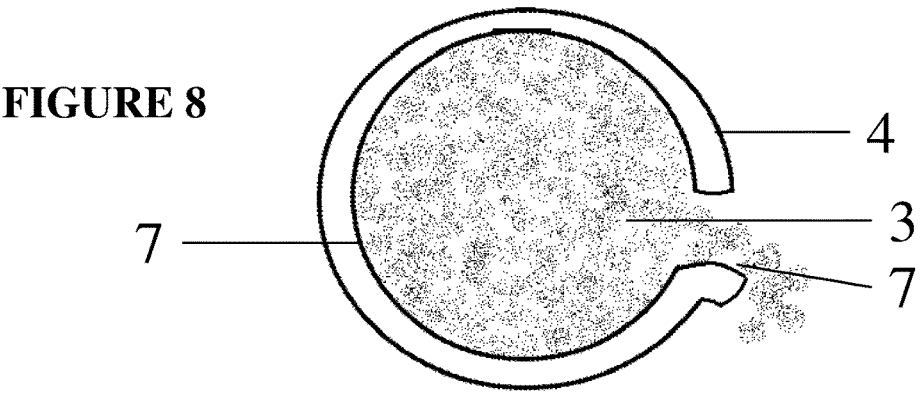

FIG. 8 shows the sphere with a piece of the attractant layer 4 peeled away, as is the gelatine-skin 7 thus allowing the insecticide dust 3 to spill.

A third sphere (not drawn) was made by using a tube, a plastic drinking straw that had a section removed lengthwise to make it smaller, and then two bands or slices were cut from an end to make two broken cut circles. One band was fitted inside the other at a 90 degree angle to make a ball-shape. This had the effect of having four open slits. Powder was vibrated into the ball by placing the ball into a container with the powder and shaken. The ball was then removed and covered with a thin layer of pure icing sugar mixture to plug the slits and allowed to dry. It was then dipped in the attractant mix.

It is assumed that different methods other than those shown here will be used in manufacturing the ball/sphere to attain the same results. It is by no means suggested that these are the only ways in which the baits can be manufactured.

It could have many slits or openings or only one. It could be two halves fitted together and be made of different materials that react, for example one shrinks, and the other expands. Or it could be a thin layer of icing sugar which serves as the solid barrier once set and does not mix with powder or toxin, yet will crack when dry and is soft enough to be peeled away with attractant surround. Many different materials of either food or artificial materials should be suitable.

These are shown to explain that it is possible to contain powder/insecticide or a toxicant within a barrier and that the barrier must break down in some way once the outer attractant layer is beginning to be removed, and that combinations and different attractants can easily be used or placed in different parts of the bait ball construction. The preferred toxicant and attractants will dictate the means of containment and the final composition of the bait.

The best result is expected to be the product that does all of the following factors; it will contain within itself some form of toxicant so that the insect will not immediately come into contact with the toxicant. It will destruct in some way. It will have a surrounding attractant layer. It will be light enough and the right size to carry easily.

The spherical design gives flexibility to all aspects of the components of the bait. They can all be changed for ease of manufacture or for the preferred method in killing the insect or different species of wasp. In general terms the most efficient way to kill a wasp nest is with a contact insecticide/toxicant, but if the preferred method is the eradication by ingestion, the toxicant inside the ball can be an agent with attractants or a substance more easily digested or more palatable for this purpose, and may be different than the outer attractants. If in specific circumstances, there is a need for fumes to be used, for example, ether, kerosene, distillate or soapy water to suffocate, the ball design will suit the purpose. Or if necessary a tracking device that was small and light enough to be carried and the nest to be located and eradicated. Any number of means may work and could be used. Manufacturing a bait that contains the insecticide/toxicant within a barrier or layer so that it cannot affect the wasp until it reaches the nest means that different insecticides or toxicants can be used than were used in previous methods of baiting. And if a specific amount of insecticide/toxicant is known to kill a specific number or area of insects, for example 5 grams will kill $m^2$, then knowing that a ball will hold 0.5 g to 1 g of insecticide/toxicant it can be assumed that the amount of balls needed would be 5-10. The known factor of the amount of toxin needed to kill a nest, depending on its size, is relevant to the amount of toxin in each ball, and if the equivalent of one wasp will return to the same food source, on average, every five minutes, it should be possible to kill a nest within a day.

The object is for the wasp to take the whole bait and for the outer layer/s to be removed by the wasp once in the nest. It specifically targets wasps and European and English wasps in particular by using scents they are attracted to and by method, they have to do their natural rolling up action with the ball to carry it to the nest and they don't feed on it until in the nest. Providing the ball is the right size and shape for carrying, the wasp will take the whole ball without interfering with any part of the ball and its construction. The ball will easily destruct in some way as it's starting to be consumed and the toxicant will spill into the nest, and continue to do so, simply by its shape and the manner in which the toxicant is released. It is important that the destructing layer allows toxicant to spill from partial openings in case the wasps are repelled by the toxicant, mixing or manufacturing attractants with the toxicant should help to relieve this.

All components of the ball design are interchangeable for ease of manufacture and for method of control for different species of the insect, they can be separate components with specific purposes or combined with one another. The toxicant can be different forms (e.g. dust, solid, liquid, gas, cream, paste, gel etc.) or different types of toxicants/insecticides e.g. ingestion, contact or others, chemicals, biological etc. The layer encasing the toxicant can be different forms, for example it can be a form of plastic with perforations or slits or easily torn, that holds the toxicant encased within itself until pressure is released by the attractant layer being removed and it releases the toxicant. Or it could be a layer that is made of a different material, natural or artificial, but will join, fuse, meld together to attractants and that will tear away from the toxicant when the attractant layer is removed thus spilling the toxicant. Or the attractant could be a mix of materials made into a ball that has the toxicant injected or by some method placed into the centre of it therefore making the attractants material the containment or protective layer.

The spherical design having an outer layer that is specifically for an attractant purpose means that different attractants may be used, whether individually layered or combined in one layer, and if an attractant is not as suited for certain species of wasps, an attractant can be used that is. Wasps are not attracted much by taste or colour so may be able to include these as repellants for other insects. And because wasps locate primarily by odour, it may be possible to have the attractant as a substance that has odours added yet is not real food. They could be one or two completely different scents, generally speaking meats and sugars, or as many combinations as needed for the attractant to work. They could be any number of odours and varying in strength. Wasps are not repelled by combinations and by combining scents it is less attractive to other insects. Combining the odours also helps to overcome the times when wasps are not greatly attracted to protein baits. The toxicant and the layer containing the toxicant can be manufactured so that it has a scent that is attractive to the wasp, thus keeping the whole of the ball or bait attractive and to allow toxicant to spill or spread effectively. Wasps also are attracted to scents that are not natural to a localized area, so a range of scents can be used, or odours that have been isolated. It may be of interest to know that even though wasps are attracted to meats, for example, that the attraction varies within that one piece of meat and is dependent on several factors, whether it is cooked or fresh, soft or hard, amount of blood, skin, fat, oil etc.

By being able to use a toxicant or pesticide that is not a delayed-action kill type allows the nest to be killed in a shorter time-frame, this should also help in preventing the insect from building a resistance to the toxicant/pesticide. A shorter time-frame also gives a greater degree of flexibility if food products are used because they should only need to remain attractive for 1-2 days. Dependent on the properties of the insecticide/toxicant this method should also help in preventing a site re-invasion of the nest while-ever the insecticide/toxicant remains active.

The attractant layer also serves as an added covering or casing that stops the insect recognising a foreign object (toxicant/protective layer) within its food source. This is important if plastic or similar is used as the material for the protective layer that contains toxicant. Plastic has distinct properties that are useful when used for the protective layer. It is light and it will not adhere to the toxicant therefore allowing it to spill effectively. It can be scented. It also has memory in that if it is formed into a shape, that is, a sphere or ball, it will retain that shape when cut or compressed. It will also roll or move with little contact and the plastic gives the ball a buoyancy-type characteristic, it will roll or fling-spilling the toxicant, especially when a dust or powder is used. It is also a foreign object and wasps will remove it from the nest, this should also aid in allowing the toxicant to spill or empty from the ball.

In a period of ten seasons of placing attractants for wasps to take, when both a meat and sugar combination was used, more wasps came for the combined attractants than single attractants. It was observed that no bees, even when bee levels were high, landed on the container holding the combined attractant, or the attractant itself. On odd occasions one would fly around the area but left quickly.

In areas that are frequented by wasps and a teaspoon of combined attractant mix was laid, wasps found the attractant on average between 10-20 minutes. The attractant was a mix of food materials that included meats and sugar (a gelatine and water mix infused with meat and sugar odours) and was moist and lasted well in sunny conditions 33° C. In 2008, when attractant was placed, 60-100 wasps at one time were taking attractant and 21 nests were located in the area. More attractant can be placed, but it was found that a teaspoon equivalent is enough to ensure wasps will locate a food source. When using balls enough should be placed to equal this. It is also possible to make placebo type balls that are mixed with the toxic ones to allow foraging patterns. When bait balls were introduced with the attractant there was a variety of reactions from the wasps. Some wasps took the balls immediately, leaving the solid attraction mix that they needed to cut and carry. Some ignored the balls at first and took from the exact place on attractant as a previous visit. Some dive-bombed the ball forgoing completely an extended rolling underneath action. It was unsure whether this was because they had already taken some. Wasps were marked with different colours for ease of identification. This helped to realise that wasps from different nests and directions were locating and taking the same bait. It also helped in timing returns, some averaged returns 2 to 2.5 minutes and some averaged 5-7 minutes.

In 2009 attractant mix with bait balls were placed over 3 days, the balls were filled with household insecticide dust, no more wasps came for the bait or were seen in the following days/weeks. In 2010 attractant was placed to which 5 of similar bait balls were added. Bait balls continued to be placed once the attractant was taken. A total of 22 bait balls were taken and 3 nests were eradicated in one day.

In the area the balls were tested the bait was never touched by birds, other insects, except odd flies and ants, but whether this was because the bait was always sourced quickly by the wasps and they acted as a deterrent, or because only a small amount of bait was used is unknown.

Bait can be placed on a heavy enough container or dish in an area that is frequented by wasps, preferably an open area, above ground level and away from pets and children. Post high is good. Ants are a deterrent to wasps and also attracted to the bait so the bottom or top of post needs to be dusted with an insecticide or a physical barrier used to discourage.

One suitable method is to use a plastic soft-drink bottle, cut so it can form a dish at its base, and the top part cut to provide an overhang to protect the bait from rain and direct sun. It can have drain holes in the bottom to allow water to drain. It can then be hung by wire for stability and placed in the ideal spot, out of the wind and weather, for example, carport/verandah, under a tree, or fixed to a post.

It should be noted that all of the invention or any component or combinations of components of the invention may be formed from or of any wood, paper, metal, synthetic or other material/s, including polymers, which may provide all or any part of the invention with essential or desired properties such as degrees of lightness, rigidity, flexibility, transparency, or otherwise, as required and or desired.

The invention may also be said broadly to consist in or of parts, elements and features as illustrated and or referred to in the description of the invention, individually or collectively, in any or all combinations of their parts or a plurality of said parts, elements or features, and where specific integers are mentioned which have known equivalents in the art to which the invention relates, such known equivalents are deemed to be incorporated as if individually set forth.

Although preferred embodiments may have been described in detail, it should be understood that various changes, substitutions, and/or alterations may be made herein by those of ordinary skills in the relevant art/s without departing from the spirit or scope of the present invention.

What is claimed is:

1. A wasp bait capable of killing wasps and larvae at a nest, the wasp bait comprising:
    a toxicant;
    at least one non-toxic protective layer that encases the toxicant, said layer including physical deformations to facilitate destruction of the bait at the nest;
    wherein said physical deformations are a plurality of slits that intersect along a portion of the protective layer;
    a non-toxic attractant layer that attracts foraging wasps, said attractant layer is bonded to and encases the at least one non-toxic protective layer; and
    wherein the size and shape of the wasp bait allows the wasp to carry the whole wasp bait to the wasp nest, and upon manipulation of the non-toxic attractant layer by a worker wasp causes the at least one non-toxic protective layer to at least partially destruct at the physical deformations and to concurrently release at least a portion of the toxicant within the nest.

2. The wasp bait of claim 1, wherein the non-toxic attractant layer includes at least one scent component.

3. The wasp bait of claim 2, wherein the scent component is selected from of at least one of a protein, a carbohydrate, and a pheromone.

4. The wasp bait of claim 1, wherein the wasp bait has a substantially spherical shape and a diameter of less than about 10 mm.

5. The wasp bait of claim 1, further comprising a tracking device.

6. The wasp bait of claim 5, wherein the tracking device is configured to be carried by the wasp and to locate the wasp nest.

7. The wasp bait of claim 1, wherein at least one non-toxic protective layer disposed between the toxicant and the non-toxic attractant layer includes a gelatin.

8. The wasp bait of claim 1, wherein when said physical deformations are in a first position, the non-toxic protective layer conceals said toxicant and when a worker wasp sufficiently manipulates the bait at the nest, the protective layer is degraded and the toxicant is spilled.

9. The wasp bait of claim 1, wherein the physical deformations of the non-toxic attractant layer are selected from perforations, holes, slits and combinations thereof.

10. The wasp bait of claim 9, wherein said at least one non-toxic protective layer has a substantially spherical shape.

11. The wasp bait of claim 10, wherein said physical deformations are a plurality of slits that intersect at a top of the protective layer and at a bottom of the protective layer.

* * * * *